No. 837,003. PATENTED NOV. 27, 1906.
W. SOBEY & C. E. MOHR.
CLUTCH MECHANISM.
APPLICATION FILED OCT. 12, 1905.

2 SHEETS—SHEET 1.

Witnesses:
Luto S. Alter
Lillian Prentice

Inventors:
William Sobey & Charles E. Mohr
by Peirce & Fisher
Attorneys

No. 837,003. PATENTED NOV. 27, 1906.
W. SOBEY & C. E. MOHR.
CLUTCH MECHANISM.
APPLICATION FILED OCT. 12, 1905.
2 SHEETS—SHEET 2.
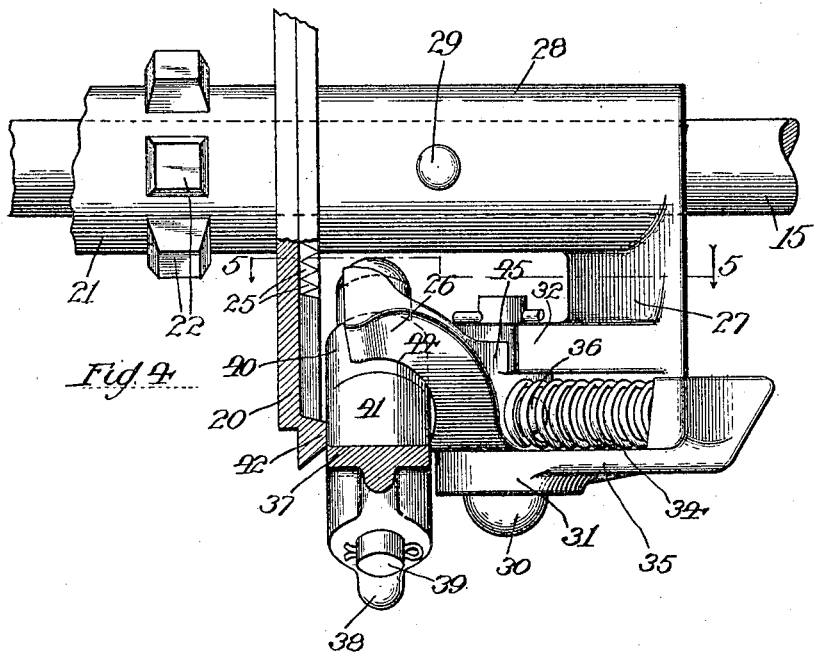
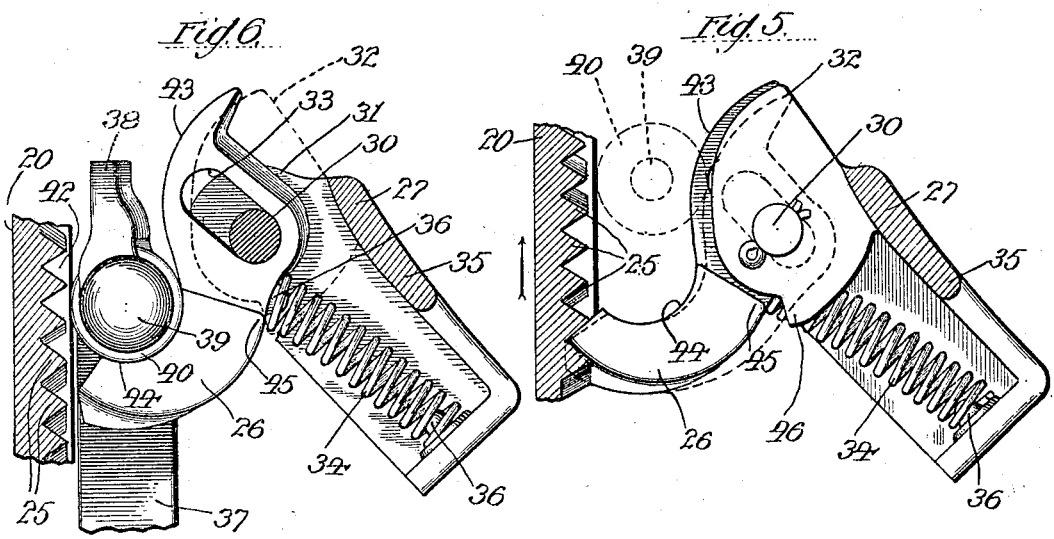
Witnesses:
Inventors:
William Sobey and Charles E. Mohr.
by Peirce & Fisher
Attorneys

UNITED STATES PATENT OFFICE.

WILLIAM SOBEY AND CHARLES ERVIN MOHR, OF RACINE, WISCONSIN, ASSIGNORS TO J. I. CASE PLOW WORKS, OF RACINE, WISCONSIN, A CORPORATION.

CLUTCH MECHANISM.

No. 837,003.  Specification of Letters Patent.  Patented Nov. 27, 1906.

Application filed October 12, 1905. Serial No. 282,411.

*To all whom it may concern:*

Be it known that we, WILLIAM SOBEY and CHARLES ERVIN MOHR, citizens of the United States, and residents of Racine, county of Racine, and State of Wisconsin, have jointly invented certain new and useful Improvements in Clutch Mechanism, of which the following is declared to be a full, clear, and exact description.

The invention relates to clutch mechanism, and particularly to that type of clutch that is designed for intermittent operation. In this type of clutch a suitable trip is provided by which the clutch member is automatically disengaged after the desired extent of movement has been effected.

The present improved clutch is designed particularly for operating the seed mechanism of corn-planters or the like in which the seeding devices are driven from the wheel-axle through the medium of the clutch, the operation of the clutch being controlled by a trip which is in turn operated by the check-row wires. In such instances it is desired to move the seeding devices for a certain predetermined distance at each operation of the clutch. While the clutch is especially designed for this purpose and is shown in connection with the planter, it is obvious that it may be used in other relations where an element is to be driven intermittently for a certain predetermined distance.

The invention seeks to provide a simple and effective form of clutch mechanism and automatic trip device therefor by which the clutch members are quickly and accurately disengaged at the proper times and by which the disengaged clutch member is held against accidental displacement or reëngagement.

With these objects in view the invention consists in the combinations and arrangements of parts hereinafter set forth, illustrated in the accompanying drawings, and more particularly pointed out in the appended claims.

Figure 1:
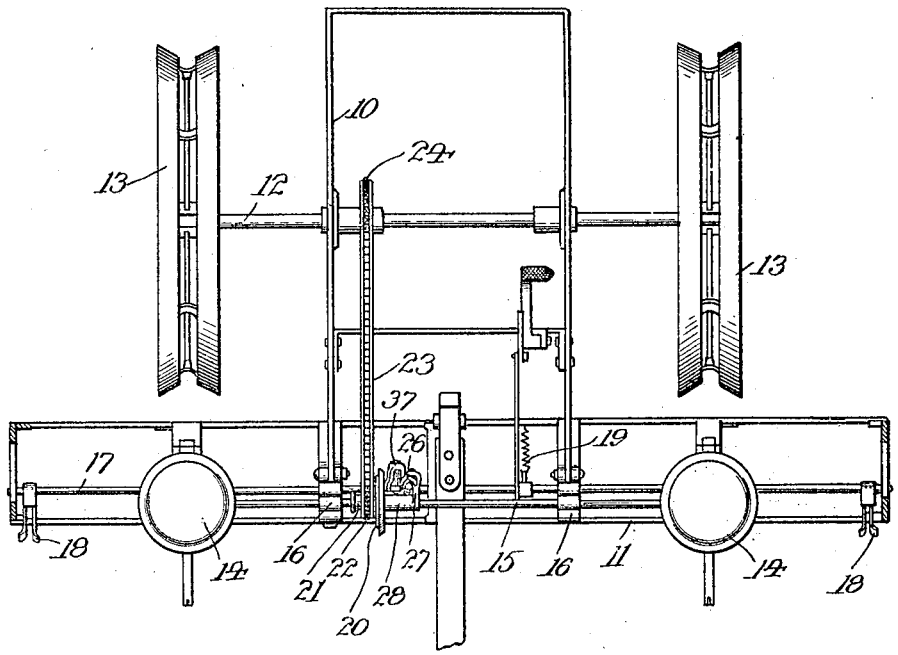
Figure 2:
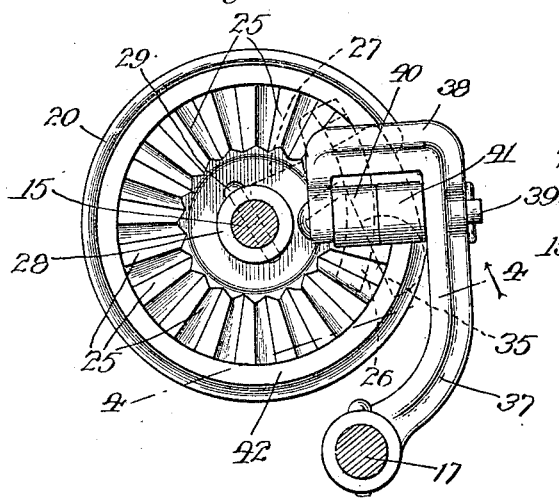
Figure 3:
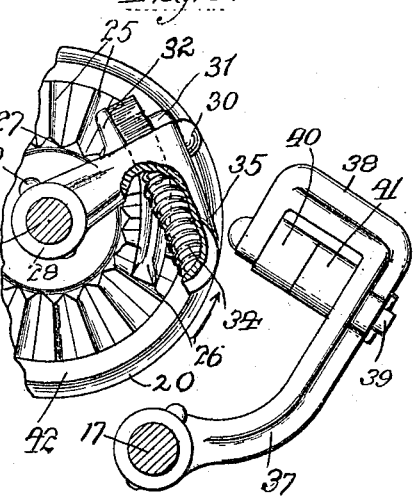

In the drawings, Figure 1 is a plan view of a planter with the improved clutch mechanism applied thereto. Fig. 2 is an elevation of the clutch with the parts shown in normal position and with a releasable clutch member shown in dotted lines. Fig. 3 is a similar view with the trip in shifted position to permit the engagement of the clutch members. Fig. 4 is an inverted plan view of the clutch with certain of the parts shown in section on line 4 4 of Fig. 2. Fig. 5 is a detail section on line 5 5 of Fig. 4 with the clutch member shown in engagement. Fig. 6 is a similar view with the clutch members held out of engagement by the trip.

The planter shown in the drawings comprises the usual main frame 10, connected at its forward end to the front runner-frame 11. The main frame is carried upon the revolving axle 12, to the ends of which the wheels 13 are fixed. The seed-cans 14, containing the seed-dropping mechanism, are mounted on the runner-frame 11, and the seed mechanism therein is operated by the rotatable cross-shaft 15, that is journaled in suitable brackets 16 on the runner-frame. A trip-rod or rock-shaft 17, journaled in the runner-frame, carries the forks 18 on its ends, and these forks are normally held in their forward position by a spring 19, connected to the trip-rod or rock-shaft. The rock-shaft is arranged to be swung rearwardly in the usual manner by the engagement of the knots on the check-row wire with the forks 18.

The clutch comprises two members, one of which is loose on the shaft 15 and is continuously driven from the wheel-axle 12. The second clutch member is fixed to the shaft 15, and its movement into and out of engagement with the clutch member is controlled by a suitable trip on the rock-shaft 17.

The loose clutch member preferably comprises a disk 20, carried on a hub 21, (see Fig. 4,) that is mounted to revolve loosely on the shaft 15 and that is provided with sprocket-teeth 22, so that the clutch-disk may be continuously driven by a chain 23, (see Fig. 1,) passing over a sprocket 24 on the wheel-axle. One face of the disk is provided with radial ratchet-teeth 25, that are arranged to be engaged by a dog 26, that forms the releasable member of the clutch-dog and is connected to an arm 27, having a hub or sleeve 28, which fits over the shaft 15 and is rigidly connected thereto by a pin 29. The dog is mounted upon a pin 30, arranged between a pair of laterally-extending lugs 31 and 32 on the end of the arm 27, and the dog is arranged to swing upon the pin 30 at right angles to the face of the disk 20 and into and out of engagement with the ratchet-teeth 25 thereon. The dog, as shown in Figs. 2, 3, and 4, is curved to conform with the circular arrangement of the ratchet-teeth 25. The tail of the dog is provided with a cross-slot 33, through which the pin 30 extends, (see Figs. 5 and 6,) and a spring is arranged to engage the dog adjacent its slotted end and shifts the dog into engagement with the ratchet-teeth of the clutch-disk when the releasing-trip is disengaged. For this purpose a cushion-spring 34 is preferably employed that is arranged in a suitable housing 35 and extends between lugs 36 on the end of the housing and on the side of the dog, as clearly shown in Fig. 6.

A trip-arm 37 is fixed to the controlling trip-rod or rock-shaft 17, and the U-shaped end 38 of the trip-rod carries a detent in the form of a cross-pin 39, which when the trip is in normal position extends radially between the clutch-disk 20 and clutch-dog 26. The pin 39 is preferably provided with rollers 40 and 41. The outer roller is arranged to engage a peripheral flange 42 on the clutch-disk 20, that projects beyond the ratchet-teeth 25, as clearly shown in Fig. 4. The inner detent-roller 40 is arranged to engage a cam-face 43 on the side of the dog opposite the cushion-spring 34. This cam-face is in the form of a reverse curve and extends from the tail of the dog first outwardly and then inwardly to a curved recessed portion 44, that forms a seat in which the roller 40 rests in normal position.

It will be observed that the spring 34 bears upon the clutch-dog 26 at a point between the seat 45 and slot 33, so that with the trip in normal operative position the spring tends to turn the dog about the roller 40—that is to say, tends to move the tail of the dog toward the disk and move the free end of the dog away from the disk so that in this position the trip and spring coöperate to hold the dog 26 securely out of engagement with the clutch-disk 20 and with the pin 30 at the outer end of the slot 33. As soon, however, as the trip is moved backwardly by the check-row wire in the position shown in Fig. 3 the spring tends to turn the dog about the pin 30 and shifts it into engagement with the ratchet-teeth 25 of the clutch-disk, as shown in Fig 5. The disk rotates in the direction of the arrow of Figs. 3 and 5, and thus tends to firmly lock the dog into engagement therewith. The clutch members and seed-shaft then rotate through a single revolution until the dog again engages the detent-roller 40 of the trip.

In clutches of this sort in which the releasable clutch member is disengaged by rotating against a trip the rotary movement of the releasable clutch member of course ceases as soon as it is disengaged, and unless there is some means for further shifting the releasable clutch member it is apt to slip back into engagement with the other clutch member if there is any looseness of the parts. In the present construction, by reason of the peculiar arrangement of tripping-detent and cam, together with the arrangement of the clutch-dog having a lost-motion or bolt-and-slot connection with its carrying-arm and the peculiar arrangement of the spring with reference to these parts, these defects are overcome. The cam portion 43 first engages the roller 40 of the tripping-detent, and by the continued movement of the parts the dog 26 is first turned about its free end, compressing the spring 34, as shown in dotted lines in Fig. 5. This shift of the dog is permitted by reason of the lost-motion or bolt-and-slot connection with the dog-supporting arm. The continued movement of the parts carries the curved cam portion 43 beyond the detent-roller 40, which then initially shifts the dog out of engagement with the ratchet-teeth. It will be noticed that as soon as the curved cam portion 43 passes over the roller 40 the pressure of the spring 34, instead of being exerted to hold the dog into engagement with the teeth of the clutch-disk, is exerted to shift the dog about the detent-roller 40 and move the free end of the dog still farther away from the ratchet-teeth 25, taking up the lost motion between the slot 33 and pin 30. In this manner the dog is quickly shifted out of engagement and well away from the ratchet-teeth 25, so that the dog cannot hit the teeth of the revolving disk or be accidentally reëngaged therewith. Moreover, the spring tends to lock the dog securely in position with the detent-roller 40 in its seat 44, so that there is no tendency to rotate the operating-shaft 15 in backward direction and all parts are held securely against movement until the trip-arm is again shifted to permit the reëngagement of the clutch members. The spring 34 thus tends to shift the clutch-dog 26 about the pin 30 into engagement with the teeth of the clutch-disk when the trip is out of its operative position, and the spring is also arranged to shift the dog about the detent-roller 40 away from the clutch-disk when the trip is in operative position. It will also be noted that the tripping-detent in operative position is between the clutch-disk and the clutch-dog and that one of the rollers thereon engages the flange 42 of the clutch-disk and the other roller engages the side of the clutch-dog, so that the members of the clutch are forced apart with great certainty.

The dog 26 is preferably provided with a shoulder 45, (see Figs. 4 and 5,) that is arranged to abut against a projection 46 on the lug 32, so as to prevent the dog from being thrown too far away from the disk.

It is obvious that numerous changes may be made in the details of structure without departure from the essentials of the invention.

Having described our invention, what we claim as new, and desire to secure by Letters Patent, is—

1. Clutch mechanism comprising two rotatable clutch members, a trip shiftable into and out of the path of one of said members, means for shifting said trip and a spring for shifting one of said members into engagement with the other and for holding said clutch members apart when said trip is in operative position, substantially as described.

2. An intermittently-operating clutch comprising a driving clutch member, a releasable clutch member, a trip for initially shifting said releasable clutch member and a spring coöperating with said trip for further separating said releasable clutch member from said driving member, substantially as described.

3. In clutch mechanism, the combination with a driving clutch member, of a releasable clutch member, a trip for initially shifting said releasable clutch member, a spring connected to said member for further shifting it from said driving clutch member and cam and detent elements coöperating with said trip and spring to shift said releasable clutch member, one of said cam and detent elements being mounted on said trip and the other on said releasable clutch member, substantially as described.

4. In intermittent clutch mechanism, the combination with a driving clutch member and a releasable clutch member, of a trip for shifting said releasable clutch member, and a spring connected to said releasable clutch member and coöperating with said trip to further shift said clutch member and lock it in idle position, substantially as described.

5. In clutch mechanism, the combination with a driving clutch member, of a releasable clutch member, a spring connected thereto and a trip for initially shifting said releasable clutch member, said trip and said releasable clutch member having coöperating means for placing said spring under tension and then releasing the same to effect the further separation of said releasable clutch member, substantially as described.

6. In clutch mechanism, the combination with the driving clutch-disk and a releasable clutch-dog, of a trip for initially shifting said dog, and a spring connected to said dog for further separating it from said disk, substantially as described.

7. In clutch mechanism, the combination with a driving clutch-disk and a releasable dog to engage the same, of a trip for said dog, and a spring for shifting said dog into engagement with said disk and coöperating with said trip, when the latter is in operative position, to shift said dog in the opposite direction away from said disk, substantially as described.

8. In clutch mechanism, the combination with a driving clutch-disk and a releasable dog to engage the same, of a trip for initially shifting said dog out of engagement with said clutch-disk, and a spring connected to said dog and coöperating with said trip to further shift the dog and lock it in idle position, substantially as described.

9. In clutch mechanism, the combination with a driving clutch-disk and a releasable dog to engage the same, of a trip for initially shifting said dog and a spring connected to said dog, said trip and dog having coöperating means for placing said spring under tension and releasing it to further shift said dog, substantially as described.

10. In clutch mechanism, the combination with a driving clutch-disk and a releasable dog to engage the same, of a trip for initially shifting said dog, a spring connected to said dog, and cam and detent elements for placing said spring under tension and releasing the same to effect the further separation of said dog from said clutch-disk, one of said cam and detent elements being arranged on said dog and the other on said trip, substantially as described.

11. In clutch mechanism, the combination with a driving clutch-disk having ratchet-teeth in one face and a raised peripheral flange, of a releasable dog for engaging the teeth of said disk and a trip shiftable between said dog and disk for separating the same and having rollers bearing on said dog and on the flange of said disk, substantially as described.

12. In clutch mechanism, the combination with a driving clutch-disk, of a releasable dog for engaging said disk, a support with which said dog has a lost-motion connection, a trip movable into and out of engagement with said dog and a spring connected to said dog and coöperating with said trip to shift the dog in opposite directions into and out of engagement with said clutch-disk, substantially as described.

13. In clutch mechanism, the combination with a driving clutch-disk, of a releasable dog for engaging said disk, a support with which said dog has a lost-motion connection, a trip for initially shifting said dog, and a spring connected to said dog, said trip and dog having coöperating means for compressing and releasing said spring to effect the further separation of said dog from said disk and lock it in idle position, substantially as described.

14. In intermittent clutch mechanism, combination with a shaft, of a driving clutch-disk loose on said shaft, an arm fixed thereto, a releasable clutch-dog on said arm, a trip movable into and out of engagement with said dog and a spring connected to said dog and coöperating with said trip to hold the dog either in its operative or idle position, substantially as described.

15. In intermittent clutch mechanism, the combination with a shaft, of a driving clutch-disk loose on said shaft, an arm fixed thereon, a releasable clutch-dog having a pin-and-slot connection with said arm, a trip for initially shifting said dog and a spring connected to said dog, said trip and dog having coöperating means for compressing and releasing said spring to effect the further separation of said dog from said clutch-disk, substantially as described.

16. In intermittent clutch mechanism, the combination with a shaft, of a driving clutch-disk loose on said shaft, an arm fixed thereon, a releasable clutch-dog having a pin-and-slot connection with said arm, a trip for initially shifting said dog and a spring connected to said dog, said dog having a curved cam portion and a recess with which said trip engages for compressing and releasing said spring to effect the further shift of said dog and lock it in idle position, substantially as described.

WILLIAM SOBEY.
CHARLES ERVIN MOHR.

Witnesses:
DANIEL E. HOWELL,
GEORGE H. BOLTON.